United States Patent
Pan

(10) Patent No.: US 8,064,170 B1
(45) Date of Patent: Nov. 22, 2011

(54) METHOD TO ALIGN A FLEXURE TAIL HAVING BENT ALIGNMENT TAB FEATURE TO A FLEX CABLE OF A HEAD GIMBAL ASSEMBLY

(75) Inventor: Tzong-Shii Pan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/019,806

(22) Filed: Feb. 2, 2011

Related U.S. Application Data

(62) Division of application No. 11/870,525, filed on Oct. 11, 2007, now Pat. No. 7,907,369.

(51) Int. Cl.
  *G11B 5/55* (2006.01)
  *H04R 31/00* (2006.01)
(52) U.S. Cl. ............. 360/264.2; 29/603.03; 29/737; 29/829; 360/245.9
(58) Field of Classification Search ......... 360/264.2, 360/245.9; 174/255, 261, 254; 361/741, 361/743; 29/603.03, 737, 829–853
See application file for complete search history.

(56) References Cited

U.S. PATENT DOCUMENTS

| | | | |
|---|---|---|---|
| 5,612,841 A | 3/1997 | Johnson | |
| 5,668,684 A | 9/1997 | Palmer et al. | |
| 5,872,687 A | 2/1999 | Arya et al. | |
| 5,903,413 A | 5/1999 | Brooks, Jr. et al. | |
| 5,920,465 A | 7/1999 | Tanaka | |
| 6,007,669 A | 12/1999 | Crumly et al. | |
| 6,145,188 A | 11/2000 | Brooks, Jr. et al. | |
| 6,360,426 B1 | 3/2002 | Summers et al. | |
| 6,367,144 B1 | 4/2002 | Holaway et al. | |
| 6,399,889 B1 | 6/2002 | Korkowski et al. | |
| 6,529,350 B1 | 3/2003 | Itoh | |
| 7,538,981 B1 * | 5/2009 | Pan | 360/264.2 |
| 7,907,369 B1 | 3/2011 | Pan | |

OTHER PUBLICATIONS

Office Action dated Aug. 5, 2010 from U.S. Appl. No. 11/870,525, 6 pages.
Office Action dated Sep. 2, 2010 from U.S. Appl. No. 11/870,525, 7 pages.
Notice of Allowance dated Nov. 8, 2010 from U.S. Appl. No. 11/870,525, 4 pages.

* cited by examiner

*Primary Examiner* — A. J. Heinz

(57) ABSTRACT

A novel method and device to align a flexure tail of a head gimbal assembly (HGA) to a flex cable of a head stack assembly (HSA) is disclosed. An alignment pin is passed through a first alignment hole in the flex cable, and a second alignment hole in the flexure tail. The second alignment hole is disposed in a region of the flexure tail that lies in a flexure tail plane that is approximately parallel to the flex cable plane adjacent the first alignment hole. A novel head gimbal assembly (HGA) has a flexure tail that includes a first bend line. The flexure tail is bent out-of-plane about the first bend line to create a residual bend angle in the range 10° to 80°. The first alignment tab is abutted against a first guide surface of an alignment fixture.

8 Claims, 6 Drawing Sheets

METHOD TO ALIGN A FLEXURE TAIL HAVING BENT ALIGNMENT TAB FEATURE TO A FLEX CABLE OF A HEAD GIMBAL ASSEMBLY

CROSS-REFERENCE TO RELATED APPLICATION

This application claims the benefit under 35 USC §121 as a divisional of U.S. patent application Ser. No. 11/870,525, filed Oct. 11, 2007 and now U.S. Pat. No. 7,907,369, which is incorporated by reference herein.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flex cable. The plurality of HGAs are attached to various arms of the actuator, and each of the laminated flexures of the HGAs has a flexure tail that is electrically connected to the HSA's flex cable.

To facilitate reliable electrical connection and secure attachment of the flexure tail(s) to the flex cable, the flexure tail(s) must first be precisely aligned with and positioned on or adjacent the flex cable. Accordingly, there is a need in the art for improved flexure tail configurations to facilitate and/or improve the use of alignment tooling used in the alignment and attachment of the flex cable and the flexure tail(s).

DETAILED DESCRIPTION OF EXAMPLE EMBODIMENTS

Figure 1:
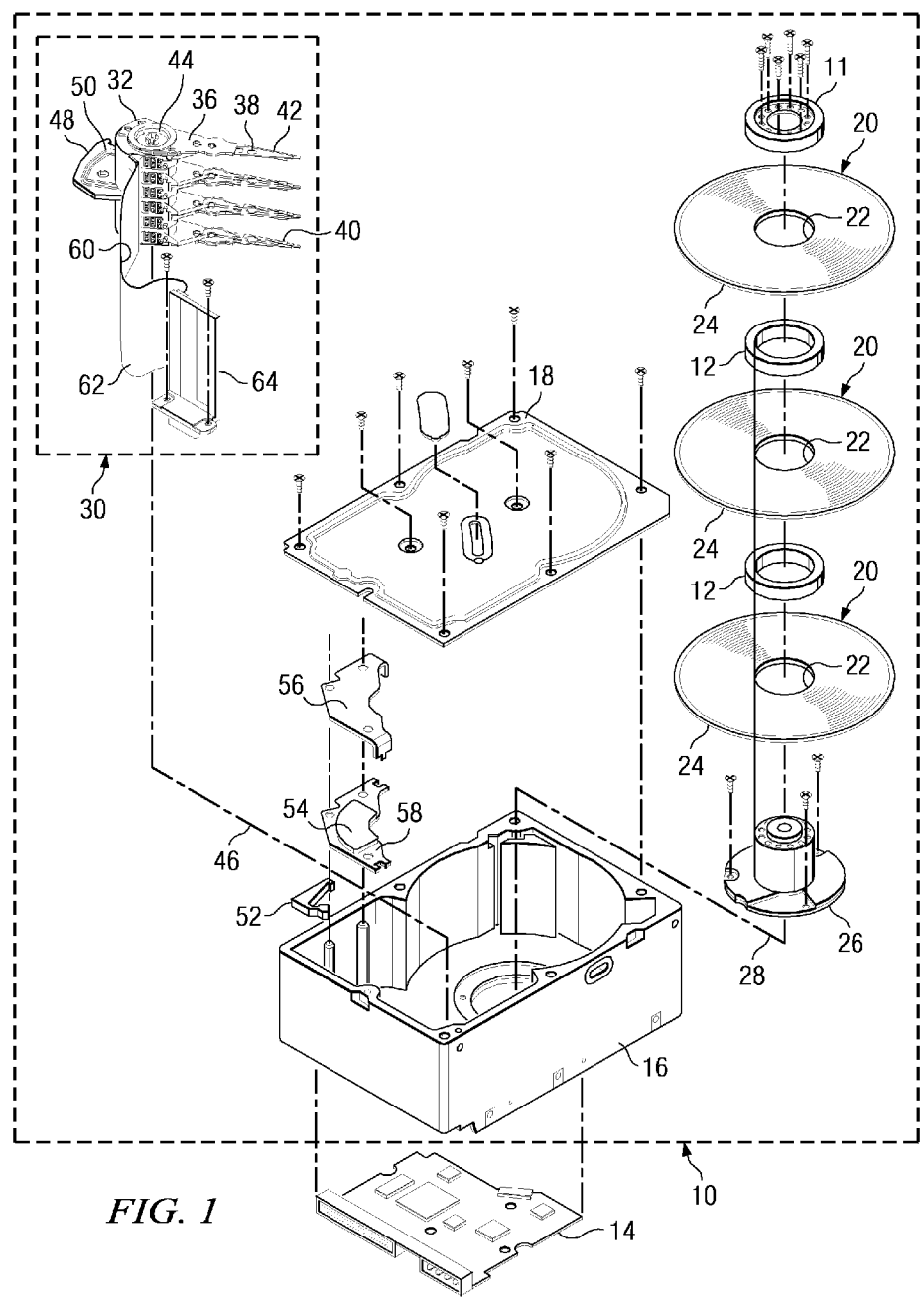
FIG. 1 is an exploded top perspective view of a disk drive including a head stack assembly that incorporates an embodiment of the present invention.

FIG. 1 illustrates a disk drive capable of including an embodiment of the present invention. The disk drive includes a head disk assembly (HDA) 10 and a printed circuit board assembly (PCBA) 14. The HDA 10 includes a base 16 and cover 18 that together house at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

The HDA 10 further includes a head stack assembly (HSA) 30 rotatably attached to the base 16 of HDA 10. The HSA 30 includes an actuator body 32 having a bore 44 and a pivot bearing cartridge engaged within the bore for facilitating the HSA 30 to rotate relative to HDA 10 about actuator pivot axis 46. One or more actuator arms 36 extend from the actuator body 32, and one or two head gimbal assemblies (HGA) 38 are attached to a distal end of each actuator arm 36. Each HGA includes a head (e.g. head 40) for reading and writing data from and to the disk 20. The HSA 30 further includes a coil support 48 that extends from one side of the HSA 30 that is opposite head 40. The coil support 48 is configured to support a coil 50 through which a changing electrical current is passed. The coil 50 interacts with one or more magnets 54 that are attached to base 16 via a yoke structure 56, 58, to form a voice coil motor for controllably rotating the HSA 30. HDA 10 includes a latch 52 rotatably mounted on base 16 to prevent undesired rotations of HSA 30.

The PCBA 14 includes a servo control system for generating servo control signals to control the current through the coil 50 and thereby position the HSA 30 relative to tracks disposed upon surfaces of disk 20. The HSA 30 is electrically connected to PCBA 14 via a flex cable assembly 60, which includes a flex cable 62 and a flex cable support bracket 64. The flex cable 62 supplies current to the coil 50 and carries signals between the HSA 30 and the PCBA 14.

In the magnetic hard disk drive of FIG. 1, the head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
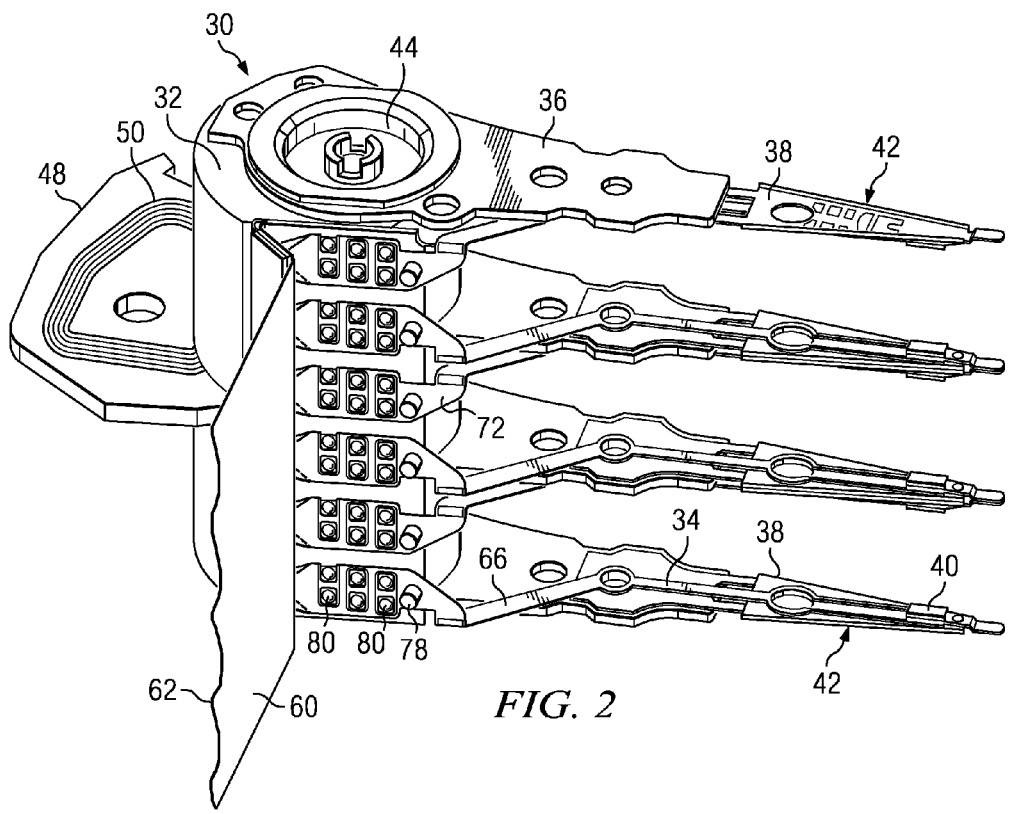
FIG. 2 is a perspective view of a head stack assembly that incorporates an embodiment of the present invention.
Figure 3:
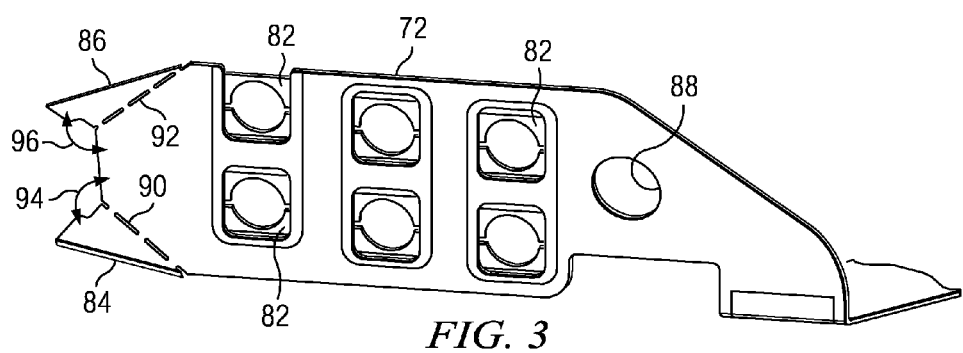
FIG. 3 depicts a terminal region of a flexure tail according to an embodiment of the present invention.
Figure 4:
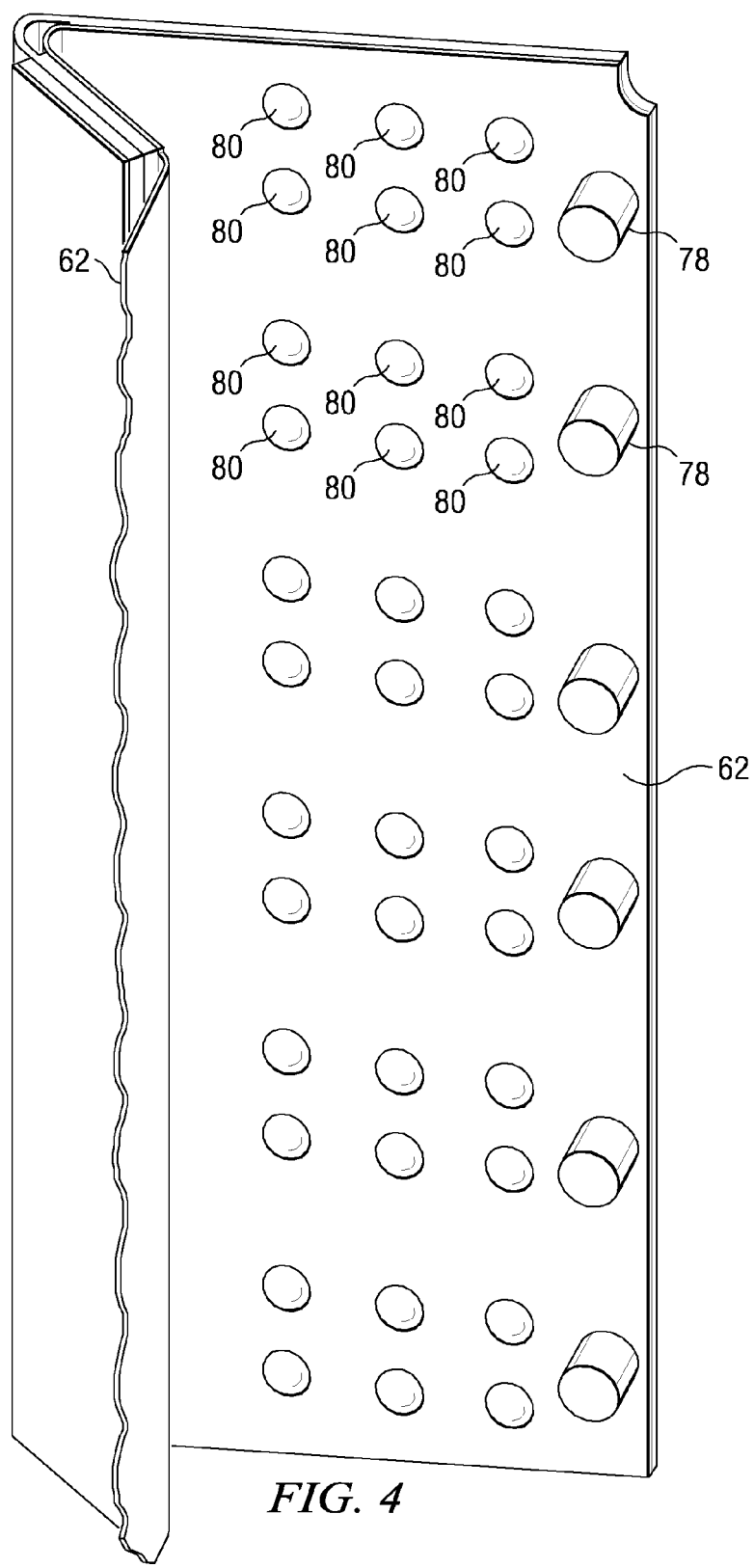
FIG. 4 depicts a portion of a flex cable that is capable of being used with an embodiment of the present invention.

Now referring to FIGS. 2-4, the head 40 is attached to and is electrically connected to a laminated flexure 34 that is a sub-component of the HGA 38 and is much smaller than the flex cable 62 of the HSA 30. The laminated flexure 34 is attached to a load beam 42 that is also a sub-component of the HGA 38. The purpose of the load beam 42 is to provide vertical compliance for the head 40 to follow vertical undulation of the surface of disk 20 as it rotates, and to preload the head 40 against the surface of disk 20 as it rotates, by a preload force that is commonly referred to as the "gram load." A first purpose of the laminated flexure 34 is to provide compliance for the head 40 to follow pitch and roll angular undulations of the surface of disk 20 as it rotates, while restricting relative motion between the head 40 and the load beam 42 in the lateral direction and about a yaw axis. A second purpose of the laminated flexure 34 is to provide a plurality of electrical paths to the head to facilitate signal transmission to/from the head 40.

For that second purpose, the laminated flexure 34 includes electrically conductive traces that are isolated from a structural layer by a dielectric layer. For example, the conductive traces may comprise copper, the structural layer may comprise stainless steel, and the dielectric layer may comprise polyimide. Portions of the electrically conductive traces are sometimes coated with an insulative cover layer (e.g. a polymer layer). So that the signals from/to the head 40 can reach the flex cable 62 near the actuator body, each HGA laminated flexure 34 includes a flexure tail 66 that extends away from the head 40 along the actuator arm 36 and ultimately attaches to the flex cable 62 adjacent the actuator body 32. That is, the laminated flexure 34 includes traces that extend from adjacent the head 40 and terminate at electrical connection points at a terminal region 72 of the flexure tail 66. The terminal region 72 defines a terminal region plane that includes the plurality of electrical terminals 82. The flex cable 62 includes electrical conduits that terminate at electrical connection points 80 which correspond to the electric terminals 82 of the terminal region 72 of the flexure tail 66. Methods of electrical attachment of the flexure tail 66 to the flex cable 62 include ultrasonic tab bonding, solder reflow, and solder jet bond (SJB).

Figure 5:
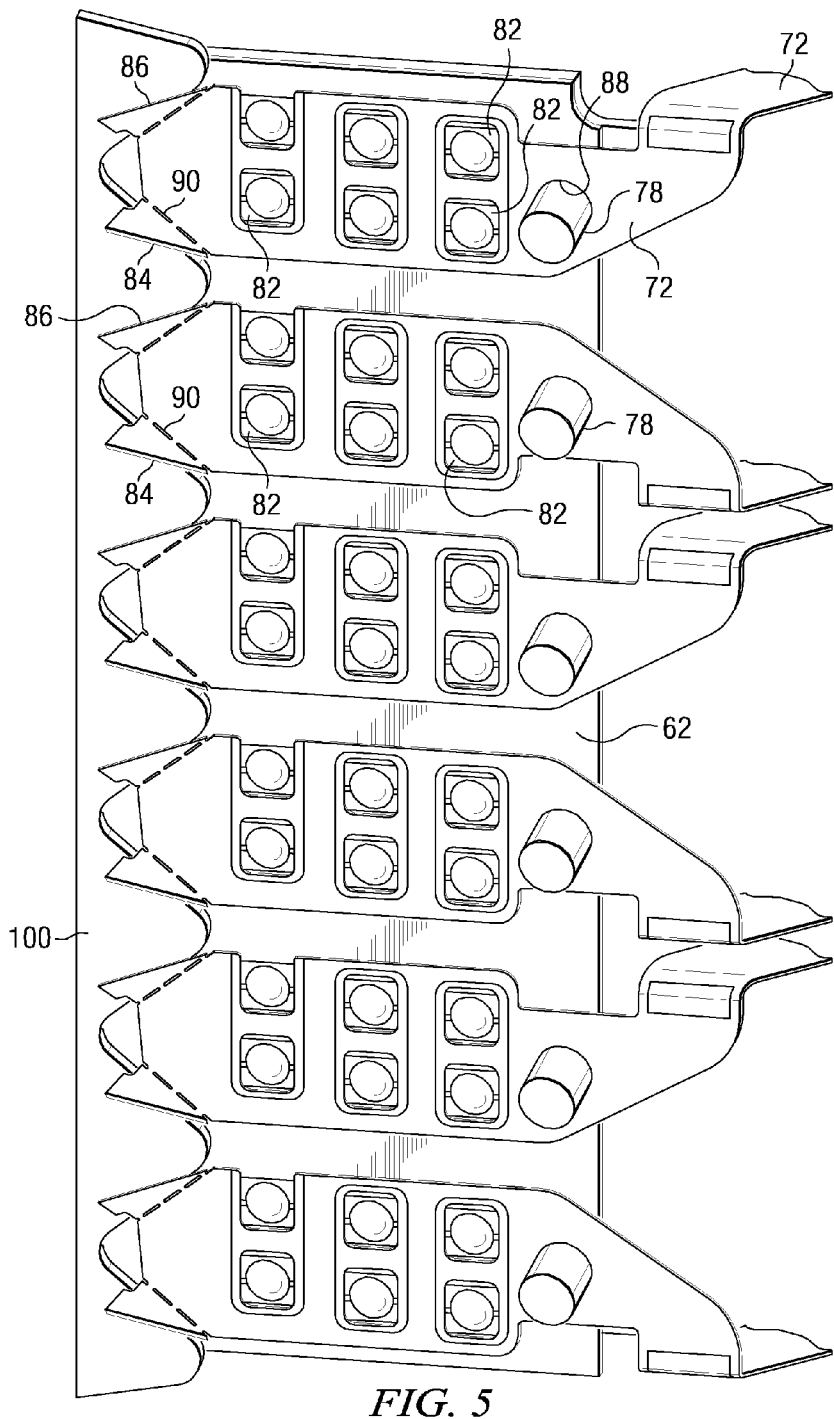
FIG. 5 depicts the alignment of a plurality of flexure tails with a flex cable by an alignment fixture that includes a saw-tooth tool, according to an embodiment of the present invention.

To facilitate reliable electrical connection and secure attachment of the flexure tails 66 to the flex cable 62, the flexure tails 66 must first be precisely aligned with and positioned on or adjacent the flex cable 62. As shown in FIGS. 3-5, translational alignment of the flexure tail 66 with the flex cable 62 can be accomplished through the use of an alignment pin 78, and alignment holes such as alignment hole 88. Preferably, the alignment pin 78 is a feature of an alignment fixture that is not a subcomponent of the HSA. In this case the alignment pin 78 preferably comprises stainless steel. Alternatively, the alignment pin 78 may be a feature of the HSA 30 (e.g., a feature of a coil overmold subcomponent 48 of the HSA 30 that may comprise acetal resin plastic, polycarbonate plastic, and/or liquid crystal polymer). Rotational alignment (a.k.a. "clocking") of the flexure tail 66 with the flex cable 62 can be accomplished through the use of a first alignment tab 84 that is bent out of the terminal region plane about a first bend line 90 by a first bend angle in the range 10° to 80°.

In the embodiment of FIG. 3, the first alignment tab 84 comprises a triangular-shaped corner of the flexure tail 66 that is demarked by the first bend line 90. It can be seen in FIG. 3 that the first bend line 90 includes a plurality of co-linear etched perforations. Such co-linear etched perforations can serve to decrease variation in positioning of the bend among parts in a manufacturing lot. For example, such a plurality of co-linear etched perforations can cause the repeatability in the location of the bend to be determined by an etching mask rather than by a bending tool. In the embodiment of FIG. 3, the terminal region 72 further includes a second alignment tab 86 that is bent out of the terminal region plane about a second bend line 92 by a second bend angle that is substantially equal to the first bend angle. For example, in the embodiment of FIG. 3, the first bend angle is preferably not more than 10° greater nor more than 10° less than the second bend angle, and more preferably any difference between the first and second bend angles is less than 5°.

The utility of the alignment tabs 84, 86 in facilitating rotational alignment of the flexure tail 66 with the flex cable 62 can be observed in FIG. 5. In the embodiment of FIG. 5, the alignment holes 88 register on alignment pins 78 to provide translational alignment, while the alignment tabs 84, 86 abut corresponding edges of a guide surface of an alignment fixture (e.g., a surface of saw-tooth tool 100) to provide rotational alignment. Alignment tabs 84, 86 may provide adequate rotational alignment even where some variation exists in the length of the terminal region 72 and even where some variation exists in the left/right translation of saw-tooth tool 100 (i.e. left and right in FIG. 5, not up and down in FIG. 5). This is because the first and second bend angles are in the range 10° to 80°, thereby allowing the first and second alignment tabs 84, 86 to function as springs that accommodate tolerances during assembly, rather than over-constraining the system by presenting two or more potentially-interfering hard registration surfaces.

Figure 6:
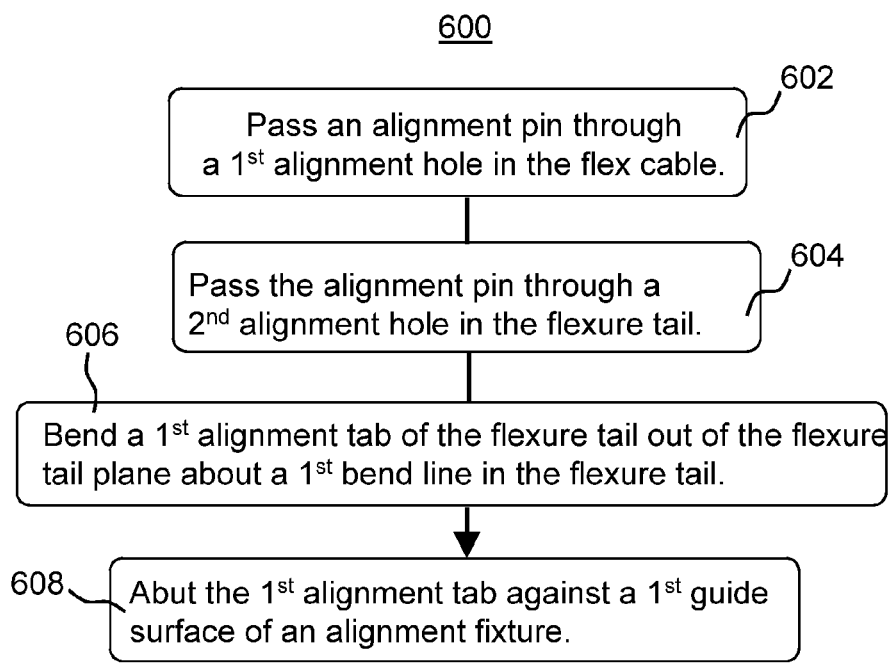
FIG. 6 depicts a method to align a flexure tail with a flex cable, according to an embodiment of the present invention.

FIG. 6 depicts a method to align flexure tail 66 of HGA 38 to flex cable 62 of HSA 30, according to an embodiment of the present invention. In the embodiment of FIG. 6, steps 602 and 604 accomplish translational alignment. Specifically, in step 602 an alignment pin (e.g. alignment pin 78) is passed through a first alignment hole in the flex cable 62. The alignment pin preferably, but not necessarily, is a feature of an alignment fixture that includes a saw-tooth tool 100. Alternatively, the alignment pin may be a feature of the HSA as described earlier. The flex cable 62 defines a flex cable plane adjacent the first alignment hole (e.g. approximately co-planar with the region of the flex cable adjacent alignment pin 78 in FIG. 4). In step 604, the alignment pin 78 is passed through a second alignment hole 88 in the flexure tail 66. The second alignment hole 88 disposed in a region 72 of the flexure tail 66 that lies in a flexure tail plane that is approximately parallel to the flex cable plane.

In the embodiment of FIG. 6, steps 606 and 608 accomplish rotational alignment (a.k.a. "clocking"). Specifically, in step 606 a first alignment tab 84 of the flexure tail 66 is bent out of the flexure tail plane about a first bend line 90 in the flexure tail 66. Preferably, the bending causes a residual bend angle to be formed in the flexure tail 66 in the range of 10° to 80° about the first bend line. In step 608, the first alignment tab 84 is abutted against a first guide surface of the alignment fixture (e.g. a surface of saw-tooth tool 100). Step 606 can precede or follow steps 602 and 604. Step 606 can precede or be accomplished concurrently with step 608. For example, the force that abuts alignment tab 84 against the first guide surface of the alignment fixture can also simultaneously cause the first alignment tab 84 to be bent out of the flexure tail plane, and/or the alignment tab 84 may be bent before being abutted against the first guide surface of the alignment fixture.

Figure 7:
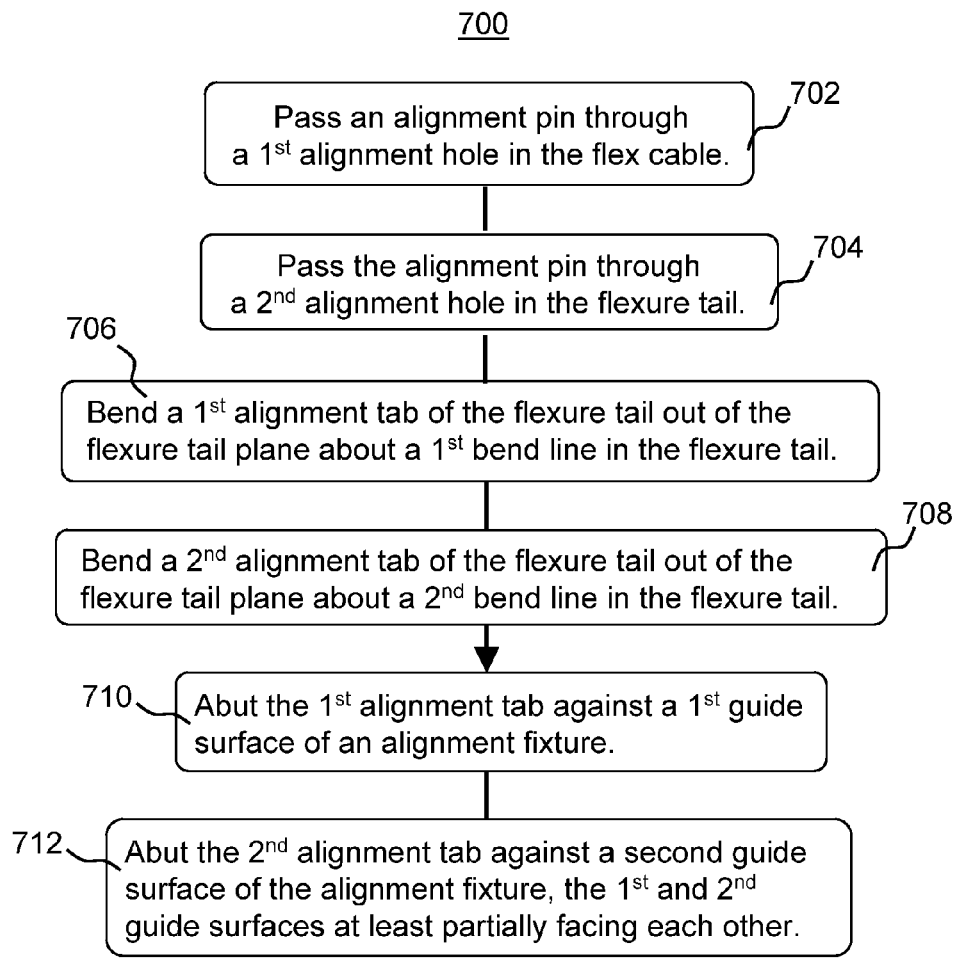
FIG. 7 depicts a method to align a flexure tail with a flex cable, according to an embodiment of the present invention.

Although the embodiment of FIG. 7 utilizes a second alignment tab 86, clocking can be accomplished with a single alignment tab (e.g. alignment tab 84) if an additional rotational registration surface or bias torque is provided. For example, a single alignment tab (e.g. alignment tab 84) can act as a spring to cause the flexure tail 66 to slightly rotate against another rotational registration surface that need not have any out-of-plane bend or spring properties. Alternatively, an externally applied non-zero bias torque acting on flexure tail 66 may be resisted by the alignment tab 84 abutting a guide surface of an alignment fixture, so that no second alignment tab is required.

FIG. 7 depicts a method to align flexure tail 66 of HGA 38 to flex cable 62 of HSA 30, according to another embodiment of the present invention. In the embodiment of FIG. 7, steps 702 and 704 accomplish translational alignment. Specifically, in step 702 an alignment pin (e.g. alignment pin 78) is passed through a first alignment hole in the flex cable 62. The alignment pin preferably, but not necessarily, is a feature of an alignment fixture that includes a saw-tooth tool 100. Alternatively, the alignment pin may be a feature of the HSA as described earlier. The flex cable 62 defines a flex cable plane adjacent the first alignment hole. In step 704, the alignment pin 78 is passed through a second alignment hole 88 in the flexure tail 66. The second alignment hole 88 disposed in a region 72 of the flexure tail 66 that lies in a flexure tail plane that is approximately parallel to the flex cable plane.

In the embodiment of FIG. 7, steps 706, 708, 710, and 712 accomplish rotational alignment (a.k.a. "clocking"). Specifically, in step 706 a first alignment tab 84 of the flexure tail 66 is bent out of the flexure tail plane about a first bend line 90 in the flexure tail 66. In step 708, a second alignment tab 86 of the flexure tail 66 is bent out of the flexure tail plane about a first bend line 92 in the flexure tail 66. In step 710, the first alignment tab 84 is abutted against a first guide surface of the alignment fixture (e.g. a surface of saw-tooth tool 100). In step 712, the second alignment tab 86 is abutted against a second guide surface of the alignment fixture. Preferably, the first and second guide surfaces at least partially face each other so that the alignment fixture need not provide a non-zero externally applied torque. Steps 706 and 708 can precede or follow steps 702 and 704. Steps 706 and 708 can precede or be accomplished concurrently with steps 710 and 712. For example, the force that abuts alignment tabs 84 and 86 against the first and second guide surfaces of the alignment fixture can also simultaneously cause the first alignment tab 84 and second alignment tab 86 to be bent out of the flexure tail plane, and/or the alignment tabs 84 and 86 may be bent before being abutted against the guide surfaces of the alignment fixture.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A method to align a flexure tail of a head gimbal assembly (HGA) to a flex cable of a head stack assembly (HSA), the method comprising:

passing an alignment pin through a first alignment hole in the flex cable, the flex cable defining a flex cable plane adjacent the first alignment hole;

passing the alignment pin through a second alignment hole in the flexure tail, the second alignment hole disposed in a region of the flexure tail that lies in a flexure tail plane that is approximately parallel to the flex cable plane;

bending a first alignment tab of the flexure tail out of the flexure tail plane about a first bend line in the flexure tail; and abutting the first alignment tab against a first guide surface of an alignment fixture.

2. The method of claim 1 wherein the first bend line comprises a plurality of co-linear etched perforations in the flexure tail.

3. The method of claim 1 wherein the bending precedes the abutting.

4. The method of claim 1 wherein the bending is a simultaneous consequence of the abutting.

5. The method of claim 1 wherein the bending comprises forming a residual bend angle in the range of 10° to 80° about the first bend line.

6. The method of claim 1 further comprising bending a second alignment tab of the flexure tail about a second bend line in the flexure tail;

abutting the second alignment tab against a second guide surface of the alignment fixture, the first and second guide surfaces at least partially facing each other.

7. The method of claim 1 wherein the alignment fixture includes the alignment pin.

8. The method of claim 1 wherein the HSA includes the alignment pin.

\* \* \* \* \*